(12) United States Patent
Xia

(10) Patent No.: US 10,262,267 B2
(45) Date of Patent: Apr. 16, 2019

(54) METHOD AND DEVICE FOR PROCESSING POLICY

(71) Applicant: Huawei Technologies Co., Ltd., Shenzhen, Guangdong (CN)

(72) Inventor: Mingzhen Xia, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 440 days.

(21) Appl. No.: 14/102,136

(22) Filed: Dec. 10, 2013

(65) Prior Publication Data

US 2014/0122406 A1    May 1, 2014

Related U.S. Application Data

(63) Continuation of application No. PCT/CN2013/074185, filed on Apr. 15, 2013.

(30) Foreign Application Priority Data

Oct. 31, 2012 (CN) .......................... 2012 1 0426064

(51) Int. Cl.
    *G06N 5/02* (2006.01)
(52) U.S. Cl.
    CPC .................... *G06N 5/025* (2013.01)
(58) Field of Classification Search
    None
    See application file for complete search history.

(56) References Cited

U.S. PATENT DOCUMENTS

| 6,167,445 | A | 12/2000 | Gai et al. |
| 2009/0171903 | A1* | 7/2009 | Lin ...................... G06F 21/604 |
| 2009/0228953 | A1* | 9/2009 | Hu ..................... G06F 15/17343 |
| | | | 726/1 |

(Continued)

FOREIGN PATENT DOCUMENTS

| CN | 1988478 A | 6/2007 |
| CN | 101098248 A | 1/2008 |
| CN | 102981822 A | 3/2013 |

OTHER PUBLICATIONS

Dr. Jim Metzler, "The 2010 Cloud Networking Report", Nov. 1, 2010, 61 pages.

*Primary Examiner* — Eric Nilsson

(57) ABSTRACT

The present invention disclose a method for processing a policy, including: obtaining at least one user policy, where the user policy is used to instruct a service processing unit to perform service processing; reading information of an application knowledge base corresponding to each user policy and performing rule conversion on the read information, so that the description language of the information is consistent with the rule description language of the user policy; combining a condition element and an action element of each user policy with information corresponding to the condition element and the action element, and compiling each result obtained through combination; and sending each compilation result to a service processing unit corresponding to each compilation result. Correspondingly, the embodiments of the present invention further disclose a device for processing a policy. The embodiments of the present invention can reduce system overhead.

9 Claims, 11 Drawing Sheets

(56) References Cited

U.S. PATENT DOCUMENTS

2011/0213869 A1* 9/2011 Korsunsky ............. G06F 21/55
709/223
2012/0191677 A1* 7/2012 Lim .................... G06F 21/6218
707/694

* cited by examiner

METHOD AND DEVICE FOR PROCESSING POLICY

CROSS-REFERENCE TO RELEVANT APPLICATION

This application is a continuation of International Application No. PCT/CN2013/074185, filed on Apr. 15, 2013, which claims priority to Chinese Patent Application No. 201210426064.9, filed on Oct. 31, 2012, both of which are hereby incorporated by reference in their entireties.

TECHNICAL FIELD

The present invention relates to the communications field, and in particular, to a method and a device for processing a policy.

BACKGROUND

A network device is provided with more and more application services of various types, including security protection, application delivery, network optimization, and the like. Specifically, application service may include an application delivery controller (ADC), a wide area network optimization controller (WOC), deep packet inspection (DPI), an intrusion prevention system (IPS), and a uniform resource locator filter (URLF), and the like. The network device tends to integrate these application services to improve service processing capability and market competitiveness of the network device. While multiple applications are integrated, the network device provides an application management and control function for a user to manage application services on the device.

At present, when a user manages and integrates application services, a differentiated manner is used for policy configuration management and service knowledge base management. In practice, however, as application services keep extending, differences between different application knowledge bases continue to increase, and it becomes more and more difficult to implement unified policy configuration and management for policies. Therefore, how to manage and integrate different application services more effectively according to a user policy is an urgent problem to be solved at present.

At present, the problem is solved mainly by directly delivering a user policy in a centralized manner. As shown in FIG. 1, a user configures a policy first, and then sends it as a user policy set to service processing units of all application services (which is shown by row 2 in FIG. 1, where WOC is a service processing unit for processing a WOC service, and DPI, ADC, URLF, and IPS are similar thereto). Each of the service processing units parse the user policy set to obtain policy rules and extract a policy rule required by itself to perform compilation. Finally, each of the service processing units executes the extracted policy rule and invokes information of an application knowledge base (as shown by row 3 in FIG. 1) corresponding to the extracted policy rule to complete service processing.

However, it is found in practice that the technology described above has at least the following defect.

All service processing units need to parse the user policy repeatedly, and need to compile the policy rule and the information of the application knowledge base separately, which causes high system resource overhead.

SUMMARY

Embodiments of the present invention provide a method and a device for processing a policy, which can reduce system overhead.

In a first aspect, the present invention provides a method for processing a policy, including:

obtaining at least one user policy, where the user policy is used to instruct a service processing unit to perform service processing;

reading information of an application knowledge base corresponding to each user policy and performing rule conversion on the read information, so that the description language of the information is consistent with the rule description language of the user policy;

combining a condition element and an action element of each user policy with information corresponding to the condition element and the action element, and compiling each result obtained through combination, where the information corresponding to the condition element and the action element is information required by the condition element and the action element in the information obtained through conversion; and sending each compilation result to a service processing unit corresponding to each compilation result.

In a first possible implementation manner, before the combining a condition element and an action element of each user policy with information corresponding to the condition element and the action element, and compiling each result obtained through combination, the method further includes:

parsing each user policy, and extracting the condition element and the action element that are included in each user policy; and extracting the information corresponding to the condition element and the action element from the information obtained through conversion.

With reference to the first aspect or the first possible implementation manner of the first aspect, in a second possible implementation manner, the combining a condition element and an action element of each user policy with information corresponding to the condition element and the action element, and compiling each result obtained through combination include:

optimizing the condition element and the action element of each user policy and the information corresponding to the condition element and the action element; and combining the condition element and the action element of each user policy with the optimized information corresponding to the condition element and the action element, and compiling each result obtained through combination;

where the optimization includes:

deleting repeated information; and/or creating a mapping relationship between the condition element and a numeric identifier ID, and between the action element and a numeric ID.

In a second aspect, the present invention provides a device for processing a policy, including an obtaining unit, a converting unit, a combining and compiling unit, and a sending unit, where:

the obtaining unit is configured to obtain at least one user policy, where the user policy is used to instruct a service processing unit to perform service processing;

the converting unit is configured to read information of an application knowledge base corresponding to the user policy obtained by the obtaining unit, and perform rule conversion on the read information, so that the description language of the information is consistent with the rule description language of the user policy;

the combining and compiling unit is configured to combine a condition element and an action element of each user policy with information corresponding to the condition element and the action element, and compile each result obtained through combination, where the information corresponding to the condition element and the action element is information required by the condition element and the action element in the information obtained through conversion; and the sending unit is configured to send each compilation result obtained by the combining and compiling unit to a service processing unit corresponding to each compilation result.

In a first possible implementation manner, the device further includes:

a parsing unit, configured to parse each user policy obtained by the obtaining unit, and extract the condition element and the action element that are included in each user policy; and an extracting unit, configured to extract the information corresponding to the condition element and the action element from the information converted by the converting unit.

With reference to the first aspect or the first possible implementation manner of the second aspect, in a second possible implementation manner, the combining and compiling unit includes:

an optimizing unit, configured to optimize the information corresponding to the condition element and the action element of each user policy; and a combining and compiling subunit, configured to combine the condition element and the action element of each user policy with the information optimized by the optimizing unit and corresponding to the condition element and the action element, and compile each result obtained through combination;

where the optimization includes:

deleting repeated information; and/or creating a mapping relationship between the condition element and a numeric identifier ID, and between the action element and a numeric ID.

In the technical solutions described above, at least one user policy is obtained, where the user policy is used to instruct a service processing unit to perform service processing; information of an application knowledge base corresponding to each user policy is read, and rule conversion is performed on the read information, so that the description language of the information is consistent with the rule description language of the user policy; a condition element and an action element of each user policy are combined with information corresponding to the condition element and the action element, and each result obtained through combination is compiled; and each compilation result is sent to a service processing unit corresponding to each compilation result. Compared with the prior art where all service processing units need to parse a user policy repeatedly and need to compile a policy rule and information of an application knowledge base separately, in the present invention, a policy is combined with information of an application knowledge base, a result obtained through combination is compiled, and a compilation result is sent to a service processing unit, which can reduce system overhead.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
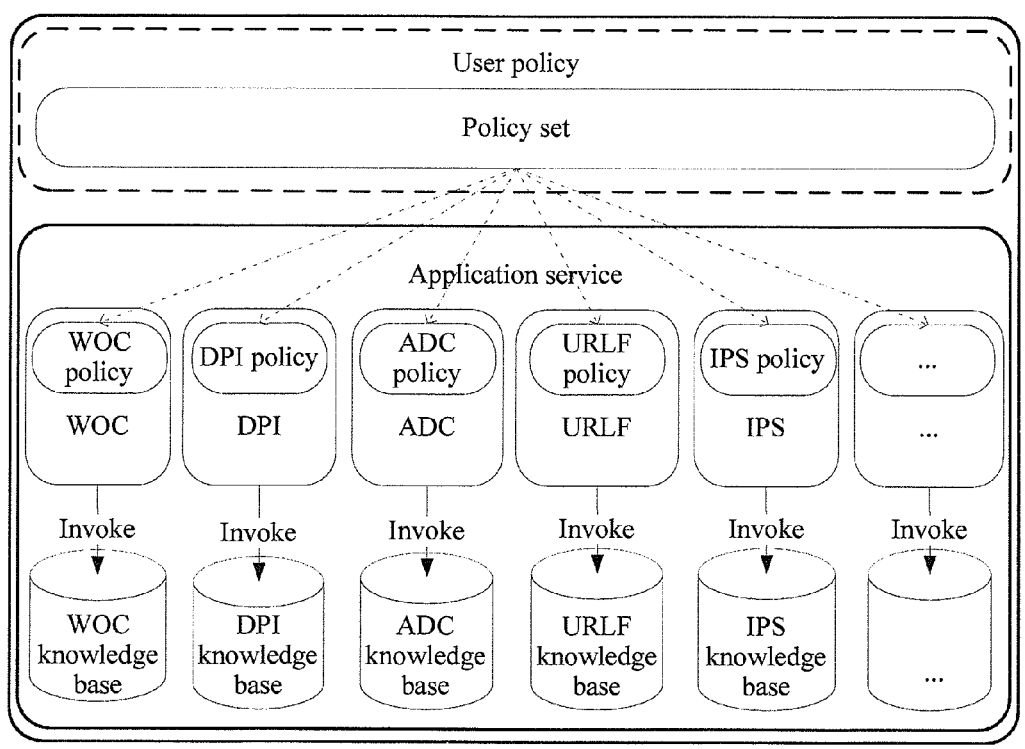
FIG. 1 is a schematic diagram of an application scenario in the prior art.
Figure 2:
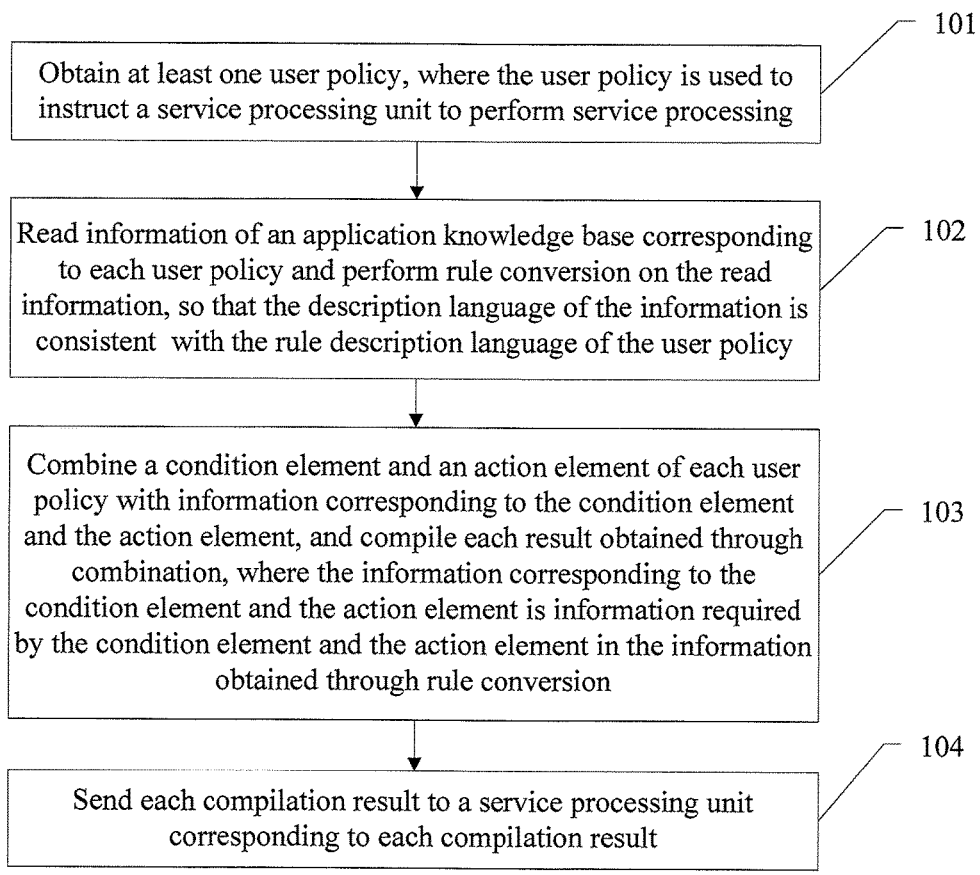
FIG. 2 is a schematic flowchart of a method for processing a policy according to an embodiment of the present invention.

FIG. 2 is a schematic flowchart of a method for processing a policy according to an embodiment of the present invention. As shown in FIG. 2, the method includes the following steps.

101. Obtain at least one user policy, where the user policy is used to instruct a service processing unit to perform service processing.

102. Read information of an application knowledge base corresponding to each user policy and perform rule conversion on the read information, so that the description language of the information is consistent with the rule description language of the user policy.

103. Combine a condition element and an action element of each user policy with information corresponding to the condition element and the action element, and compile each result obtained through combination, where the information corresponding to the condition element and the action element is information required by the condition element and the action element in the information obtained through conversion.

104. Send each compilation result to a service processing unit corresponding to each compilation result.

It should be noted that, the information required by the condition element and the action element refers to information in an application knowledge base that needs to be used when the service processing unit uses the user policy subsequently, that is, information in an application knowledge base that needs to be used when the service processing unit uses the condition element and the action element. In other words, the information is information in an application knowledge base required for executing the user policy corresponding to the condition element and the action element, which is common sense and will not be described in detail herein.

By using the steps described above, each policy and information required by each policy can be combined, the result obtained through combination is compiled, and finally, the compilation result is sent to the service processing unit. In such cases, a service processor does not need to compile the policy and the information in an application knowledge base, and the service processing unit can directly identify and use the result received by the service processing unit. Compared with the prior art where each service processing unit compiles a policy and information in an application knowledge base separately, the present invention can reduce system overhead.

Optionally, the service processing unit may, after obtaining the result, complete service processing according to the result.

As an optional implementation manner, the method may be specifically applied to a network device and to an application scenario where integration is implemented by external configuration and internal configuration for improving management efficiency and improving system performance.

Figure 3:
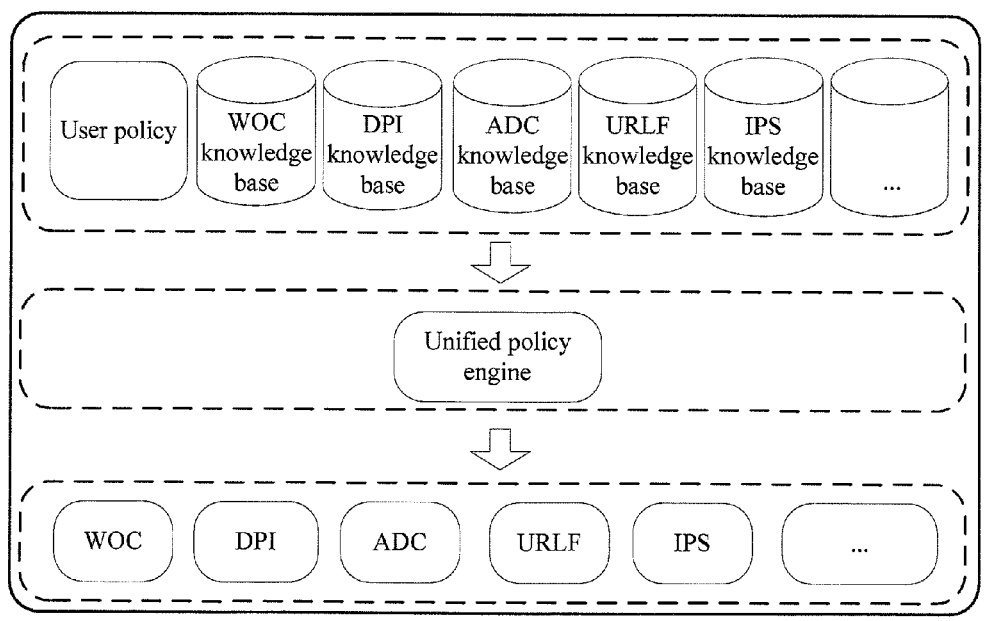
FIG. 3 is a schematic diagram of an optional application scenario of a method for processing a policy according to an embodiment of the present invention.

As an optional implementation manner, as shown in FIG. 3, row 1 in FIG. 3 may represent a user policy obtained in step 101 and an application knowledge base corresponding to the obtained user policy. A unified policy engine in row 2 may represent unified conversion, combination, and compilation processing on the obtained user policy and information of the corresponding application knowledge base in step 102 and step 103. Row 3 represents a service processing unit corresponding to the obtained user policy. For example, WOC is a service processing unit for processing a WOC service; DPI, ADC, URLF, and IPS are similar thereto, and will not be described repeatedly herein.

In the technical solution described above, at least one user policy is obtained, where the user policy is used to instruct a service processing unit to perform service processing; information of an application knowledge base corresponding to each user policy is read, and rule conversion is performed on the read information, so that the description language of the information is consistent with the rule description language of the user policy; a condition element and an action element of each user policy are combined with information corresponding to the condition element and the action element, and each result obtained through combination is compiled; and each compilation result is sent to a service processing unit corresponding to each compilation result. Compared with the prior art where all service processing units need to parse a user policy repeatedly and need to compile a policy rule and information of an application knowledge base separately, in the present invention, a policy is combined with information of an application knowledge base, a result obtained through combination is compiled, and a compilation result is sent to a service processing unit, which can reduce system overhead.

Figure 4:
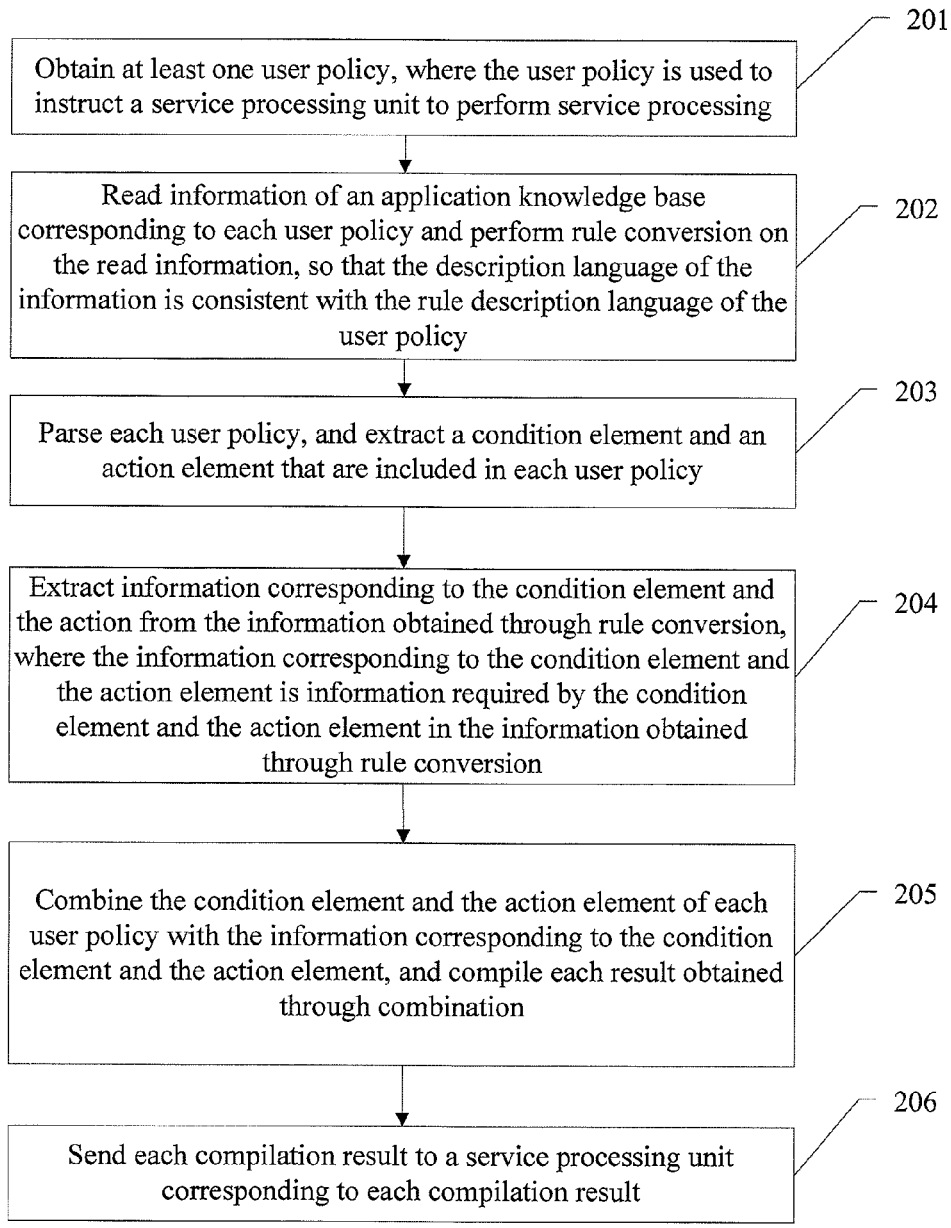
FIG. 4 is a schematic flowchart of another method for processing a policy according to an embodiment of the present invention.

FIG. 4 is a schematic flowchart of another method for processing a policy according to an embodiment of the present invention. As shown in FIG. 4, the method includes the following steps.

201. Obtain at least one user policy, where the user policy is used to instruct a service processing unit to perform service processing.

202. Read information of an application knowledge base corresponding to each user policy and perform rule conversion on the read information, so that the description language of the information is consistent with the rule description language of the user policy.

Optionally, the information may specifically include: knowledge base rule information and configuration data.

In this implementation manner, combination and compilation in subsequent steps are combining and compiling the knowledge base rule information and the configuration data, thereby combining and compiling only the knowledge base rule information and the configuration data in the application knowledge base, so as to reduce system overhead.

Optionally, the application knowledge base corresponding to the user policy may specifically be an application knowledge base of an application service corresponding to at least one policy included in the user policy. For example, the user policy includes policy 1, policy 2, and policy 3. In such cases, the application knowledge base corresponding to the user policy may specifically be an application knowledge base of an application service corresponding to policy 1, an application knowledge base of an application service corresponding to policy 2, and an application knowledge base of an application service corresponding to policy 3.

When the language of the read content described above is converted into a language consistent with the user policy, they may be combined.

203. Parse each user policy, and extract a condition element and an action element that are included in each user policy.

Optionally, a user policy may specifically be a combination of a condition element and an action element. Step 203 may specifically be parsing at least one policy included in the user policy, so as to obtain a condition element and an action element of each policy.

204. Extract information corresponding to the condition element and the action element from the information obtained through conversion, where the information corresponding to the condition element and the action element is information required by the condition element and the action element in the information obtained through conversion.

Optionally, the information corresponding to the condition element and the action element may also be information required by the condition element and the action element, which refers to information in an application knowledge base that needs to be used when a service processing unit uses the policy subsequently, that is, information in an application knowledge base that needs to be used when the service processing unit uses the condition element and the action element; for example, information in an application knowledge base that needs to be used when a service processing unit verifies a condition of a policy, or for another example, information in an application knowledge base that needs to be used when a service processing unit performs a service application action set in a policy.

Optionally, the information corresponding to the condition element and the action element may specifically be knowledge base rule information and configuration data that are corresponding to the condition element and the action element.

205. Combine the condition element and the action element of each user policy with the information corresponding to the condition element and the action element, and compile each result obtained through combination.

Optionally, a compilation result obtained by compiling the result obtained through combination may specifically be a result which may be identified and used by the service processing unit. For example, the compilation result may be a data structure. The present invention sets no limit to a compiling manner.

206. Send each compilation result to a service processing unit corresponding to each compilation result.

As an optional implementation manner, the user policy in the present invention may specifically include:

a centralized user policy, where the centralized user policy refers to a user policy that is configured in advance to be sent as a user policy set to a service processing unit; or a classified user policy, where the classified user policy refers to a user policy that is configured in advance to be sent as a user policy classification to a service processing unit.

As an optional implementation manner, step 201 may specifically include:

obtaining at least one centralized user policy.

It should be noted that, the centralized user policy indicates that a user considers, when configuring a policy, only an actual application scenario to which a device is applicable and does not consider a specific classification of policies under the scenario, and the user policy is delivered as a whole set. That is to say, each policy is delivered to a service processing unit of each application service. In other words, an application service corresponding to each policy is all services of the device.

Optionally, the reading information of an application knowledge base corresponding to each user policy in step 202 may specifically include:

reading information of all application knowledge bases of the device implementing the method.

Optionally, step 206 may specifically include:

sending each compilation result to the service processing unit corresponding to the information of each compilation result, where the information of the compilation result is information included in the result obtained through combination corresponding to the compilation result.

It should be noted that, an application service corresponding to information may specifically be an application service corresponding to an application knowledge base including the information. For example, if the information is information of a WOC knowledge base, the application service corresponding to the information is a WOC application service.

Figure 5:
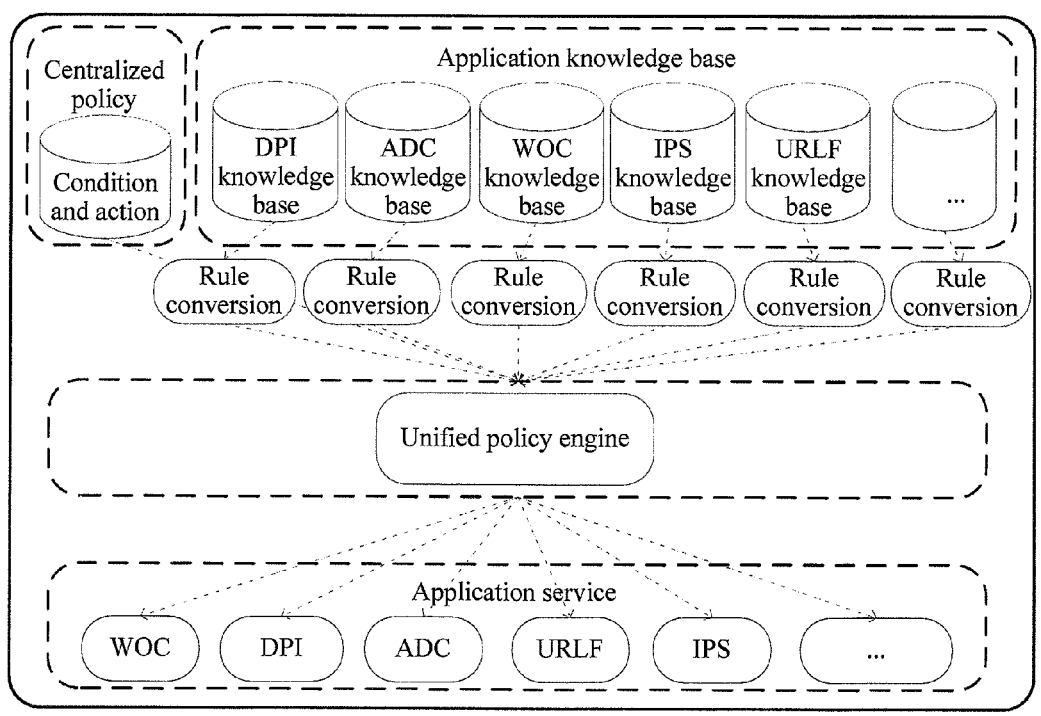
FIG. 5 is a schematic diagram of an optional application scenario of a method for processing a policy according to an embodiment of the present invention.

It should be noted that, when the obtained user policy is a centralized user policy, the user considers, when configuring the centralized user policy, only the application scenario and does not consider a specific classification of the policies. In other words, the centralized user policy configured by the user corresponds to all application services. In the prior art, all policies of the centralized user policy are sent to the service processing unit of each application service, and the service processing unit extracts a policy that needs to be used by the service processing unit. In the present invention, as shown in FIG. 5, row 1 may represent the user policy obtained in step 201 and all the application knowledge bases of the device implementing the method, and rule conversion in row 2 may represent the rule conversion performed on the information of all the application knowledge bases in step 202. A unified policy engine in row 3 may, as described in step 203, step 204, and step 205, parse the obtained user policy; extract the information corresponding to the condition element and the action element of each user policy from the information obtained through conversion; and then combine the condition element and the action element that are obtained by parsing with the information corresponding to the condition element and the action element and perform compiling, where the information is the information in the application knowledge base. In such cases, a policy (that is, the compilation result) that needs to be used by each application service may be obtained by using the information. Row 4 represents a service processing unit corresponding to the obtained user policy. In such cases, the compilation result is sent to the service processing unit corresponding to the information of each compilation result by performing step 206. For example, information required by policy 1 is information in WOC, DPI, and ADC knowledge bases; in this way, it may be determined that a policy that needs to be used by WOC, DPI, and ADC application services is policy 1. In step 205, a condition element and an action element of policy 1 are combined with the information required by the policy, and then compiled, and in step 206, a compilation result corresponding to policy 1 may be sent to service processing units of the WOC, DPI, and ADC application services.

As an optional implementation manner, step 201 may specifically include:

obtaining at least one classified user policy.

It should be noted that, a user configures, when configuring a classified user policy, a classification with respect to different application services, and a user policy is configured for a specific service processing unit. In other words, there is a corresponding relationship between policies included in a classified user policy and application services. For example, policy 1 corresponds to WOC and DPI application services, so that a policy corresponding to the WOC and DPI application services is policy 1. In step 202, the application knowledge base of the application service corresponding to the user policy may be read. In step 206, the compilation result may be sent to the service processing unit corresponding to the policy corresponding to the compilation result. For example, in step 206, the compilation result corresponding to policy 1 is sent to service processing units of the WOC and DPI application services.

Figure 6:
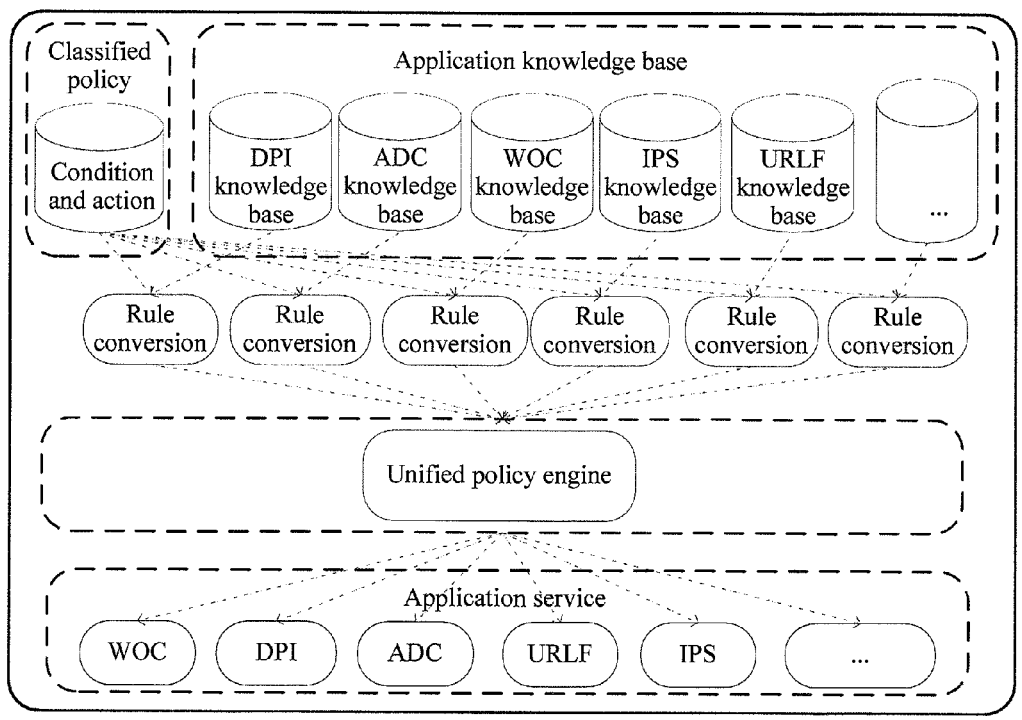
FIG. 6 is a schematic diagram of an optional application scenario of a method for processing a policy according to an embodiment of the present invention.

As an optional implementation manner, as shown in FIG. 6, row 1 may represent the user policy obtained in step 201 and the application knowledge base corresponding to the obtained user policy. Rule conversion in row 2 may represent the rule conversion performed on the information of the application knowledge base corresponding to the obtained user policy in step 202. FIG. 6 shows multiple blocks indicating rule conversion. Because rule description languages of the obtained user policies are consistent, the present invention may perform unified rule conversion on the information of the application knowledge base corresponding to the obtained user policy. Definitely, when the rule description languages of the user policies are different languages, the present invention may also separately perform rule conversion on the information of the application knowledge base corresponding to each user policy, thereby ensuring that the rule description language of each user policy and the information of the application knowledge base corresponding to the user policy are the same. A unified policy engine in row 3 in FIG. 6 may, as described in step 203, step 204, and step 205, parse the obtained user policy; extract the information corresponding to the condition element and the action element of each user policy from the information obtained through conversion; and then combine the condition element and the action element that are obtained by parsing with the information corresponding to the condition element and the action element and perform compiling.

In the technical solution described above, on the basis of the embodiment described above, steps are added to parse the at least one user policy, extract the condition element and the action element that are included in the at least one user policy, and extract the information corresponding to the condition element and the action element from the information obtained through conversion. This can implement unified parsing of all policies, and extract the information corresponding to all condition elements and action elements that are obtained by parsing in a unified manner, thereby reducing system overhead.

Figure 7:
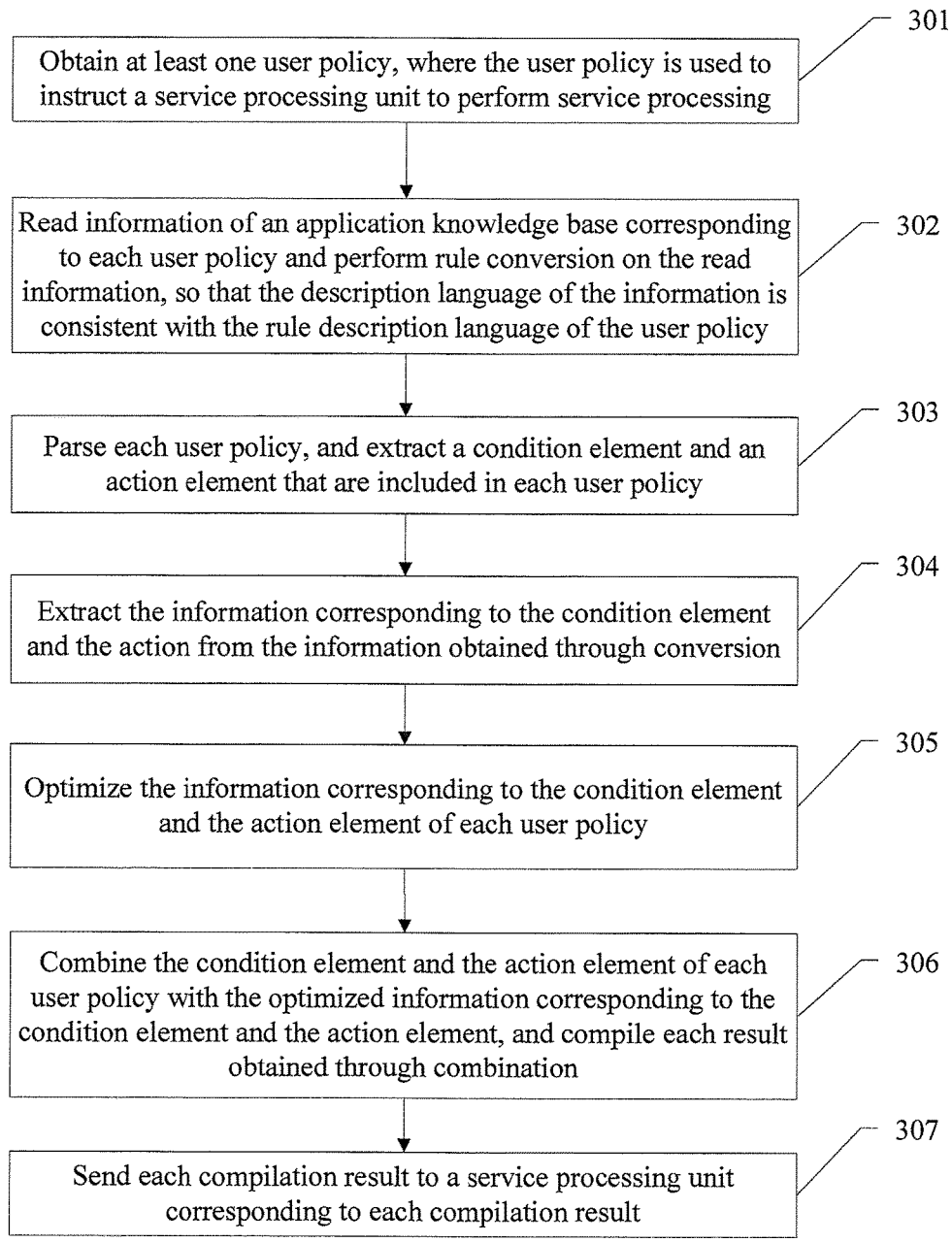
FIG. 7 is a schematic flowchart of another method for processing a policy according to an embodiment of the present invention.

FIG. 7 is a schematic flowchart of another method for processing a policy according to an embodiment of the present invention. As shown in FIG. 7, the method includes the following steps.

301. Obtain at least one user policy, where the user policy is used to instruct a service processing unit to perform service processing.

302. Read information of an application knowledge base corresponding to each user policy and perform rule conversion on the read information, so that the description language of the information is consistent with the rule description language of the user policy.

303. Parse each user policy, and extract a condition element and an action element that are included in each user policy.

304. Extract information corresponding to the condition element and the action element from the information obtained through conversion.

305. Optimize the information corresponding to the condition element and the action element of each user policy.

Optionally, the optimization includes:

deleting repeated information; and/or creating a mapping relationship between the condition element and a numeric ID, and between the action element and a numeric ID.

Optionally, for example, information required by policy 1 is information in WOC, DPI, and ADC knowledge bases, and information extracted from the WOC, DPI, and ADC knowledge bases in step 304 has repeated information; in such cases, the repeated information may be deleted by performing step 305. That is to say, repeated knowledge base rule information and configuration data are deleted. This can reduce system overhead in subsequent combination and compilation processes.

Optionally, the creating a mapping relationship between the condition element and a numeric ID, and between the action element and a numeric ID may specifically be understood as assigning a numeric ID (for example, an identity, ID) to each condition element and to each action element, so that only the numeric IDs need to be processed in subsequent combination and compilation processes, thereby achieving the effect of compressing information and unifying service interfaces.

306. Combine the condition element and the action element of each user policy with the optimized info/nation corresponding to the condition element and the action element, and compile each result obtained through combination.

307. Send each compilation result to a service processing unit corresponding to each compilation result.

As an optional implementation manner, in the embodiment, the obtained user policy may specifically include the centralized user policy and/or the classified user policy described above. Refer to the embodiment described above for the specific implementation process.

In the technical solution described above, on the basis of the embodiment described above, a step is added to optimize the info/nation corresponding to the condition element and the action element of each user policy. Compared with the embodiment described above, the implementation process of this embodiment uses less system overhead.

The following describes apparatus embodiments of the present invention. The apparatus embodiments of the present invention are used to perform the methods implemented in the method embodiments of the present invention. For the convenience of description, only parts relevant to the embodiment of the present invention are described, and refer to the embodiments 1 of the present invention for specific technical details that are not disclosed.

Figure 8:
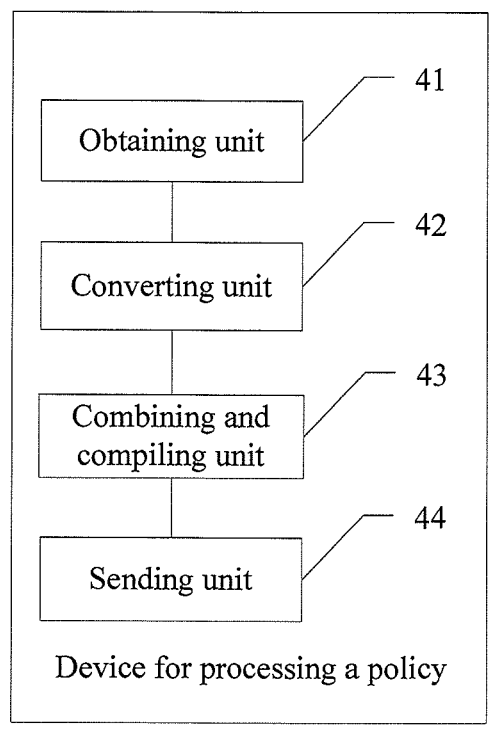
FIG. 8 is a schematic structural diagram of a device for processing a policy according to an embodiment of the present invention.

FIG. 8 is a schematic structural diagram of a device for processing a policy according to an embodiment of the present invention. As shown in FIG. 8, the device includes an obtaining unit 41, a converting unit 42, a combining and compiling unit 43, and a sending unit 44, where the obtaining unit 41 is configured to obtain at least one user policy, where the user policy is used to instruct a service processing unit to perform service processing;

the converting unit 42 is configured to read information of an application knowledge base corresponding to the user policy obtained by the obtaining unit 41, and perform rule conversion on the read information, so that the description language of the information is consistent with the rule description language of the user policy;

the combining and compiling unit 43 is configured to combine a condition element and an action element of each user policy with information corresponding to the condition element and the action element, and compile each result obtained through combination, where the information corresponding to the condition element and the action element is information required by the condition element and the action element in the information converted by the converting unit 42; and the sending unit 44 is configured to send each compilation result obtained by the combining and compiling unit 43 to a service processing unit corresponding to each compilation result.

It should be noted that, the information required by the condition element and the action element refers to information in an application knowledge base that needs to be used when the service processing unit uses the user policy subsequently, that is, information in an application knowledge base that needs to be used when the service processing unit uses the condition element and the action element. In other words, the information is information in an application knowledge base required for executing the user policy corresponding to the condition element and the action element, which is common sense and will not be described in detail herein.

By using the units described above, each policy and information required by each policy can be combined, the result obtained through combination is compiled, and finally, the compilation result is sent to the service processing unit. In such cases, a service processor does not need to compile the policy and the information in an application knowledge base, and the service processing unit can directly identify and use the result received by the service processing unit. Compared with the prior art where each service processing unit compiles a policy and information in an application knowledge base separately, the present invention can reduce system overhead.

Optionally, the service processing unit may, after obtaining the result, complete service processing according to the result.

As an optional implementation manner, the device includes a device which uses the controlling policy, such as a network device.

In the technical solution described above, the obtaining unit obtains at least one user policy, where the user policy is used to instruct a service processing unit to perform service processing; the converting unit reads information of an application knowledge base corresponding to each user policy, and performs rule conversion on the read information, so that the description language of the information is consistent with the rule description language of the user policy; the combining and compiling unit combines a condition element and an action element of each user policy with information corresponding to the condition element and the action element, and compiles each result obtained through combination; and the sending unit sends each compilation result to a service processing unit corresponding to each compilation result. Compared with the prior art where all service processing units need to parse a user policy repeatedly and need to compile a policy rule and information of an application knowledge base separately, in the present invention, a policy is combined with information of an application knowledge base, a result obtained through combination is compiled, and a compilation result is sent to a service processing unit, which can reduce system overhead.

Figure 9:
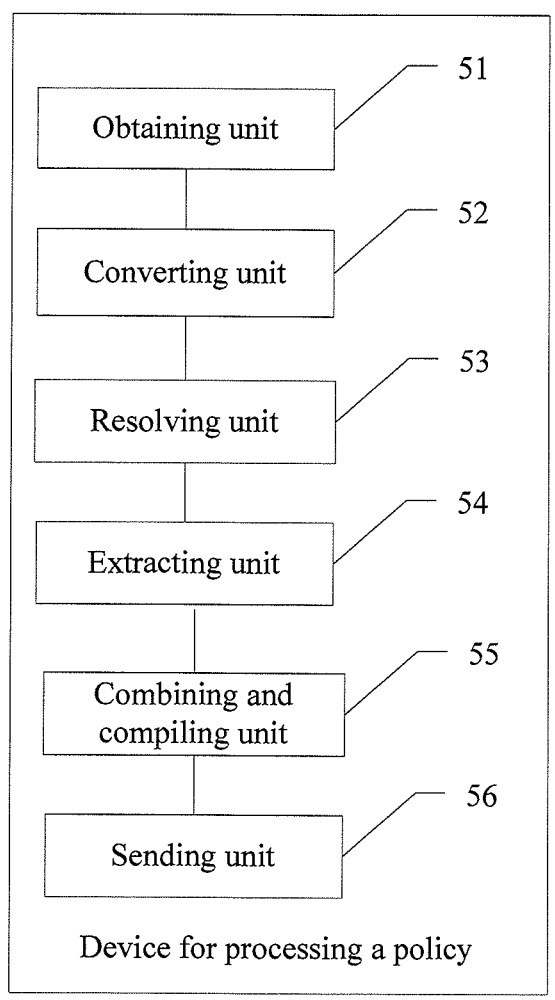
FIG. 9 is a schematic structural diagram of another device for processing a policy according to an embodiment of the present invention.

FIG. 9 is a schematic structural diagram of another device for processing a policy according to an embodiment of the present invention. As shown in FIG. 9, the device includes an obtaining unit 51, a converting unit 52, a parsing unit 53, an extracting unit 54, a combining and compiling unit 55, and a sending unit 56.

The obtaining unit 51 is configured to obtain at least one user policy, where the user policy is used to instruct a service processing unit to perform service processing.

The converting unit 52 is configured to read information of an application knowledge base corresponding to the user policy obtained by the obtaining unit 51, and perform rule conversion on the read information, so that the description language of the information is consistent with the rule description language of the user policy.

Optionally, the information may specifically include: knowledge base rule information and configuration data.

In this implementation manner, combination and compilation in subsequent steps are combining and compiling the knowledge base rule information and the configuration data, thereby combining and compiling only the knowledge base rule information and the configuration data in the application knowledge base, so as to reduce system overhead.

Optionally, the application knowledge base corresponding to the user policy may specifically be an application knowledge base of an application service corresponding to at least one policy included in the user policy. For example, the user policy includes policy 1, policy 2, and policy 3. In such cases, the application knowledge base corresponding to the user policy may specifically be an application knowledge base of an application service corresponding to policy 1, an application knowledge base of an application service corresponding to policy 2, and an application knowledge base of an application service corresponding to policy 3.

When the language of the read content described above is converted into a language consistent with the user policy, they may be combined.

The parsing unit 53 is configured to parse the user policy obtained by the obtaining unit 51, and extract the condition element and the action element that are included in user policy obtained by the obtaining unit 51.

Optionally, a user policy may specifically be a combination of a condition element and an action element. The parsing unit 53 may specifically parse at least one policy included in the user policy, so as to obtain a condition element and an action element of each policy.

The extracting unit 54 is configured to extract information corresponding to the condition element and the action element from the information converted by the converting unit 52.

Optionally, the information required by the condition element and the action element refers to information in an application knowledge base that needs to be used when a service processing unit uses the policy subsequently, that is, information in an application knowledge base that needs to be used when the service processing unit uses the condition element and the action element; for example, information in an application knowledge base that needs to be used when a service processing unit verifies a condition of a policy, or for another example, information in an application knowledge base that needs to be used when a service processing unit performs a service application action set in a policy.

Optionally, the information corresponding to the condition element and the action element may specifically be knowledge base rule information and configuration data that are corresponding to the condition element and the action element.

The combining and compiling unit 55 is configured to combine the condition element and the action element of each user policy with the information corresponding to the condition element and the action element, and compile each result obtained through combination.

Optionally, a compilation result obtained by compiling the result obtained through combination may specifically be a result which may be identified and used by the service processing unit. For example, the compilation result may be a data structure. The present invention sets no limit to a compiling manner.

The sending unit 56 is configured to send each compilation result obtained by the combining and compiling unit 55 to a service processing unit corresponding to each compilation result.

As an optional implementation manner, the user policy in the present invention may specifically include:

a centralized user policy, where the centralized user policy refers to a user policy that is configured in advance to be sent as a user policy set to a service processing unit; or a classified user policy, where the classified user policy refers to a user policy that is configured in advance to be sent as a user policy classification to a service processing unit.

As an optional implementation manner, the obtaining unit 51 may be further configured to obtain at least one centralized user policy.

It should be noted that, the centralized user policy indicates that a user considers, when configuring a policy, only an actual application scenario to which a device is applicable and does not consider a specific classification of policies under the scenario, and the user policy is delivered as a whole set. That is to say, each policy is delivered to a service processing unit of each application service. In other words, an application service corresponding to each policy is all services of the device.

Optionally, the converting unit 52 may be further configured to read information of all application knowledge bases of the device, and perform rule conversion on the read information, so that the description language of the information is consistent with the rule description language of the user policy.

Optionally, the sending unit 56 may be further configured to send each compilation result to the service processing unit corresponding to the information of each compilation result, where the information of the compilation result is information included in the result obtained through combination corresponding to the compilation result.

It should be noted that, an application service corresponding to information may specifically be an application service corresponding to an application knowledge base including the information. For example, if the information is information of a WOC knowledge base, the application service corresponding to the information is a WOC application service.

It should be noted that, when the obtained user policy is a centralized user policy, the user considers, when configuring the centralized user policy, only the application scenario and does not consider a specific classification of the policies. In other words, the centralized user policy configured by the user corresponds to all application services. In the prior art, all policies of the centralized user policy are sent to the service processing unit of each application service, and the service processing unit extracts a policy that needs to be used by the service processing unit. In the present invention, as shown in FIG. 5, row 1 may represent the user policy obtained by the obtaining unit 51 and all the application knowledge bases of the device implementing the method, and rule conversion in row 2 may represent the rule conversion performed by the converting unit 52 on the information of all the application knowledge bases. A unified policy engine in row 3 may, acting as the parsing unit 53, the extracting unit 54, and the combining and compiling unit 55, parse the obtained user policy; extract the information corresponding to the condition element and the action of each user policy from the information obtained through conversion; and then combine the condition element and the action element that are obtained by parsing with the information corresponding to the condition element and the action element and perform compiling, where the information is the information in the application knowledge base. In such cases, a policy (that is, the compilation result) that needs to be used by each application service may be obtained by using the information. Row 4 represents a service processing unit corresponding to the obtained user policy. In such cases, the compilation result is sent, by using the sending unit 56, to the service processing unit corresponding to the information of each compilation result. For example, information required by policy 1 is information in WOC, DPI, and ADC knowledge bases; in this way, it may be determined that a policy that needs to be used by WOC, DPI, and ADC application services is policy 1. The combining and compiling unit 55 combines and compiles a condition element and an action element of policy 1 with the information required by the policy, and the sending unit 56 sends the compilation result corresponding to policy 1 to service processing units of the WOC, DPI, and ADC application services.

As an optional implementation manner, the obtaining unit 51 may be further configured to obtain at least one classified user policy.

It should be noted that, a user configures, when configuring a classified user policy, a classification with respect to different application services, and a user policy is configured for a specific service processing unit. In other words, there is a corresponding relationship between policies included in a classified user policy and application services. For example, policy 1 corresponds to WOC and DPI application services, so that a policy corresponding to the WOC and DPI application services is policy 1. The combining and compiling unit 55 may combines and compiles a condition element and an action element of policy 1 with the information required by the policy 1, and the sending unit 56 may send the compilation result to the service processing unit corresponding to the policy corresponding to the compilation result. For example, the sending unit 56 sends the compilation result corresponding to policy 1 to service processing units of the WOC and DPI application services.

In the technical solution described above, on the basis of the embodiment described above, the parsing unit is added to parse the at least one user policy, and extract the condition element and the action element that are included in the at least one user policy; and the extracting unit is added to extract the information corresponding to the condition element and the action from the information obtained through conversion. This can implement unified parsing of all policies, and extract the information corresponding to all condition elements and action elements that are obtained by parsing in a unified manner, thereby reducing system overhead.

Figure 10:
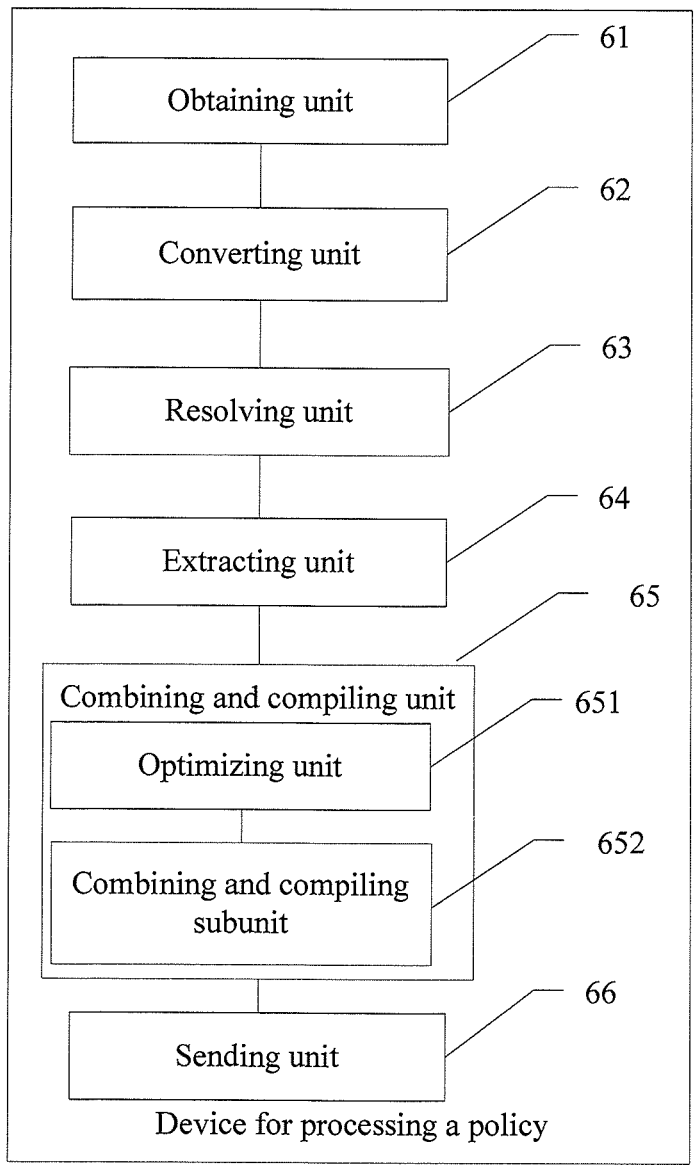
FIG. 10 is a schematic structural diagram of another device for processing a policy according to an embodiment of the present invention.

FIG. 10 is a schematic structural diagram of another device for processing a policy according to an embodiment of the present invention. As shown in FIG. 10, the device includes an obtaining unit 61, a converting unit 62, a parsing unit 63, an extracting unit 64, a combining and compiling unit 65, and a sending unit 66, where the combining and compiling unit 65 includes an optimizing unit 651 and a combining and compiling subunit 652.

The obtaining unit 61 is configured to obtain at least one user policy, where the user policy is used to instruct a service processing unit to perform service processing.

The converting unit 62 is configured to read information of an application knowledge base corresponding to the user policy obtained by the obtaining unit 61, and perform rule conversion on the read information, so that the description language of the information is consistent with the rule description language of the user policy.

The parsing unit 63 is configured to parse the user policy obtained by the obtaining unit 62, and extract a condition element and an action element that are included in the user policy obtained by the obtaining unit 62.

The extracting unit 64 is configured to extract the information required by the condition element and the action from the information converted by the converting unit 62.

The optimizing unit 651 is configured to optimize information corresponding to the condition element and the action element of each user policy.

Optionally, the optimization includes:

deleting repeated information; and/or creating a mapping relationship between the condition element and a numeric ID, and between the action element and a numeric ID.

Optionally, for example, information required by policy 1 is information in WOC, DPI, and ADC knowledge bases, and information extracted from the WOC, DPI, and ADC knowledge bases by the extracting unit 64 has repeated information; in such cases, the repeated information may be deleted by the optimizing unit 651. That is to say, repeated knowledge base rule information and configuration data are deleted. This can reduce system overhead in subsequent combination and compilation processes.

Optionally, the creating a mapping relationship between the condition element and a numeric ID, and between the action element and a numeric ID may specifically be understood as assigning a numeric ID (for example, an identity, ID) to each condition element and to each action element, so that only the numeric IDs need to be processed in the subsequent combination and compilation processes, thereby achieving the effect of compressing information and unifying service interfaces.

The combining and compiling subunit 652 is configured to combine the condition element and the action element of each user policy with the information optimized by the optimizing unit 651 and corresponding to the condition element and the action element of each user policy, and compile each result obtained through combination.

The sending unit 66 is configured to send each compilation result obtained by the combining and compiling unit 652 to a service processing unit corresponding to each compilation result.

As an optional implementation manner, in the embodiment, the obtained user policy may specifically include the centralized user policy and/or the classified user policy described above. Refer to the embodiment described above for the specific implementation process.

In the technical solution described above, on the basis of the embodiment described above, the optimizing unit is added to optimize the information corresponding to the condition element and the action element of each user policy. Compared with the embodiment described above, the implementation process of this embodiment uses less system overhead.

Figure 11:
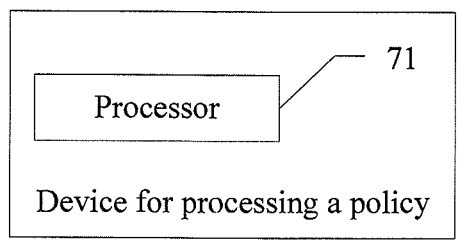
FIG. 11 is a schematic structural diagram of another device for processing a policy according to an embodiment of the present invention.

FIG. 11 is a schematic structural diagram of another device for processing a policy according to an embodiment of the present invention. As shown in FIG. 11, the device includes a processor 71 and a memory 72.

The processor 71 is configured to perform the following steps:

obtaining at least one user policy, where the user policy is used to instruct a service processing unit to perform service processing;

reading information of an application knowledge base corresponding to each user policy and stored by the memory 72, and performing rule conversion on the read information, so that the description language of the information is consistent with the rule description language of the user policy;

combining a condition element and an action element of each user policy with information corresponding to the condition element and the action element, and compiling each result obtained through combination, where the information corresponding to the condition element and the action element is information required by the condition element and the action element in the information obtained through conversion; and sending each compilation result to a service processing unit corresponding to each compilation result.

The memory 72 is configured to store the information of the application knowledge base.

Optionally, the memory 72 may be further configured to store a program executed by the processor 71.

It should be noted that, the service processing unit may specifically be a subunit in the processor 71.

In the technical solution described above, at least one user policy is obtained, where the user policy is used to instruct a service processing unit to perform service processing; information of an application knowledge base corresponding to each user policy is read, and rule conversion is performed on the read information, so that the description language of the information is consistent with the rule description language of the user policy; a condition element and an action element of each user policy are combined with information corresponding to the condition element and the action element, and each result obtained through combination is compiled; and each compilation result is sent to a service processing unit corresponding to each compilation result. Compared with the prior art where all service processing units need to parse a user policy repeatedly and need to compile a policy rule and information of an application knowledge base separately, in the present invention, a policy is combined with information of an application knowledge base, a result obtained through combination is compiled, and a compilation result is sent to a service processing unit, which can reduce system overhead.

Figure 12:
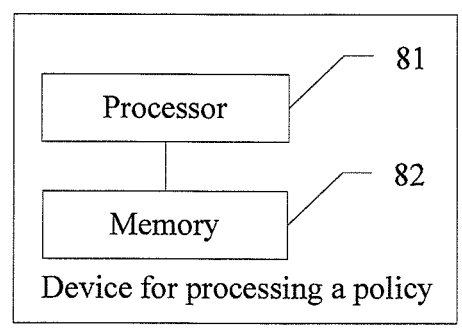
FIG. 12 is a schematic structural diagram of another device for processing a policy according to an embodiment of the present invention.

FIG. 12 is a schematic structural diagram of another device for processing a policy according to an embodiment of the present invention. As shown in FIG. 12, the device includes a processor 81 and a memory 82.

The processor 81 is configured to perform the following steps:

obtaining at least one user policy, where the user policy is used to instruct a service processing unit to perform service processing;

reading information of an application knowledge base corresponding to each user policy and performing rule conversion on the read information, so that the description language of the information is consistent with the rule description language of the user policy;

parsing each user policy, and extracting a condition element and an action element that are included in each user policy;

extracting information corresponding to the condition element and the action from the information obtained through conversion, where the information corresponding to the condition element and the action element is information required by the condition element and the action element in the information obtained through conversion;

combining the condition element and the action element of each user policy with the information corresponding to the condition element and the action element, and compile each result obtained through combination; and sending each compilation result to a service processing unit corresponding to each compilation result.

The memory 82 is configured to store the information of the application knowledge base.

As an optional implementation manner, the information may specifically include:

knowledge base rule information and configuration data.

In this implementation manner, combination and compilation in subsequent steps are combining and compiling the knowledge base rule information and the configuration data, thereby combining and compiling only the knowledge base rule information and the configuration data in the application knowledge base, so as to reduce system overhead.

As an optional implementation manner, the user policy in the present invention may specifically include:

a centralized user policy, where the centralized user policy refers to a user policy that is configured in advance to be sent as a user policy set to a service processing unit; or a classified user policy, where the classified user policy refers to a user policy that is configured in advance to be sent as a user policy classification to a service processing unit.

As an optional implementation manner, the step performed by the processor 81 for obtaining at least one user policy may include:

obtaining at least one centralized user policy.

It should be noted that, the centralized user policy indicates that a user considers, when configuring a policy, only an actual application scenario to which a device is applicable and does not consider a specific classification of policies under the scenario, and the user policy is delivered as a whole set. That is to say, each policy is delivered to a service processing unit of each application service. In other words, an application service corresponding to each policy is all services of the device.

Optionally, the step performed by the processor 81 for reading information of an application knowledge base corresponding to each user policy may specifically include:

reading information of all application knowledge bases of the device.

Optionally, the step performed by the processor 81 for sending each compilation result to a service processing unit corresponding to each compilation result may specifically include:

sending each compilation result to the service processing unit corresponding to the information of each compilation result, where the information of the compilation result is information included in the result obtained through combination corresponding to the compilation result.

As an optional implementation manner, the step performed by the processor 81 for obtaining a user policy may include: obtaining at least one classified user policy.

As an optional implementation manner, the processor 81 may be further configured to perform the following steps:

obtaining at least one user policy, where the user policy is used to instruct a service processing unit to perform service processing;

reading information of an application knowledge base corresponding to each user policy and performing rule conversion on the read information, so that the description language of the information is consistent with the rule description language of the user policy, where the information includes knowledge base rule information and configuration data;

parsing each user policy, and extracting a condition element and an action element that are included in each user policy;

extracting information corresponding to the condition element and the action from the information obtained through conversion, where the information corresponding to the condition element and the action element is information required by the condition element and the action element in the information obtained through conversion;

optimizing the information corresponding to the condition element and the action element of each user policy;

combining the condition element and the action element of each user policy with information corresponding to the optimized condition element and the action element, and compiling each result obtained through combination; and sending each compilation result to a service processing unit corresponding to each compilation result.

As an optional implementation manner, the optimization may specifically include:

deleting repeated information; and/or creating a mapping relationship between the condition element and a numeric ID, and between the action element and a numeric ID.

As an optional implementation manner, the memory 82 may be further configured to store a program executed by the processor 81.

In the technical solution described above, on the basis of the embodiment described above, steps are added to parse the at least one user policy, extract the condition element and the action element that are included in the at least one user policy, and extract the information corresponding to the condition element and the action from the information obtained through conversion. This can implement unified parsing of all policies, and extract the information required by all condition elements and action elements that are obtained by parsing in a unified manner, thereby reducing system overhead.

A person of ordinary skill in the art should understand that, all or a part of the steps of the method according to the embodiments may be implemented by a computer program instructing relevant hardware. The program may be stored in a computer readable storage medium. When the program is run, the steps of the method according to the embodiments are performed. The storage medium may be a magnetic disk, a CD-ROM, a read-only memory (Read-Only Memory, ROM), a random access memory (Random Access Memory, RAM), or the like.

The foregoing disclosures are merely exemplary embodiments of the present invention. However, the protection scope of the present invention is not limited thereto. Therefore, equivalent variations made according to the claims of the present invention shall fall within the protection scope of the present invention.

What is claimed is:

1. A method for processing a policy implemented by a computer program, wherein the computer program instructs a hardware processor to perform the method to form a unified policy engine and a plurality of service processing units respectively corresponding to a plurality of application knowledge bases, the method comprising:

obtaining a plurality of user policies by the unified policy engine, wherein each user policy includes at least one classified user policy, each classified user policy corresponds to a specific user policy classification, the each user policy is configured in advance to be sent to one service processing unit corresponding to the each user policy in the plurality of service processing units, each service processing unit further corresponds to one application knowledge base of one application service in the plurality of application knowledge bases, and the plurality of service processing units include at least two service processing units selected from: a wide area network optimization controller (WOC), a deep packet inspection (DPI), an application delivery controller (ADC), a uniform resource locator filter (URLF), or an intrusion prevention system (IPS);

reading information of the plurality of application knowledge bases corresponding to the plurality of user policies, and performing rule conversion on the information in the unified policy engine, so that the description language of the information is converted to be consistent with a same one rule description language of the plurality of user policies;

combining a condition element and an action element of the each user policy with information corresponding to the condition element and the action element, and compiling each result obtained through combination to obtain a compilation result in the unified policy engine, wherein the information corresponding to the condition element and the action element is information required by the condition element and the action element in the information obtained through rule conversion, and the compilation result is a data structure that is capable of being identified and used by the one service processing unit corresponding to the each user policy; and sending the compilation result to the one service processing unit by the unified policy engine.

2. The method according to claim 1, wherein before combining the condition element and the action element of the each user policy with information corresponding to the condition element and the action element, and compiling each result obtained through combination, the method further comprises:

parsing the each user policy, and extracting the condition element and the action element that are comprised in the each user policy; and extracting the information corresponding to the condition element and the action element from the information obtained through rule conversion.

3. The method according to claim 1, wherein combining the condition element and the action element of the each user policy with information corresponding to the condition element and the action element, and compiling each result obtained through combination, comprises:

optimizing the condition element and the action element of the each user policy and the information corresponding to the condition element and the action element; and combining the condition element and the action element of the each user policy with the optimized information corresponding to the condition element and the action element, and compiling each result obtained through combination;

wherein the optimization comprises:
deleting repeated information; and/or
creating a mapping relationship between the condition element and a numeric identifier ID, and a mapping relationship between the action element and a numeric ID.

4. The method according to claim 1, wherein when the each user policy comprises a centralized user policy, the reading information of an application knowledge base corresponding to the each user policy comprises:

reading information of all application knowledge bases.

5. A device for processing a policy, the device comprising a hardware processor and a non-transitory memory coupled to the hardware processor; wherein the hardware processor being configured to execute a computer program in the non-transitory memory to form a unified policy engine and a plurality of service processing units respectively corresponding to a plurality of application knowledge bases, and the hardware processor being further configured to execute the computer program to perform operations of:

obtaining a plurality of user policies by the unified policy engine, wherein each user policy includes at least one classified user policy, each classified user policy corresponds to a specific user policy classification, the each user policy is configured in advance to be sent to one service processing unit corresponding to the each user policy in the plurality of service processing units, each service processing unit further corresponds to one application knowledge base of one application service in the plurality of application knowledge bases, and the plurality of service processing units include at least two service processing units selected from: a wide area network optimization controller (WOC), a deep packet inspection (DPI), an application delivery controller (ADC), a uniform resource locator filter (URLF), or an intrusion prevention system (IPS);

reading information of the plurality of application knowledge bases corresponding to the plurality of user policies, and performing rule conversion on the information in the unified policy engine, so that the description language of the information is converted to be consistent with a same one rule description language of the plurality of user policies;

combining a condition element and an action element of the each user policy with information corresponding to the condition element and the action element, and compiling each result obtained through combination to obtain a compilation result in the unified policy engine, wherein the information corresponding to the condition element and the action element is information required by the condition element and the action element in the information obtained through rule conversion, and the compilation result is a data structure that is capable of being identified and used by the one service processing unit corresponding to the each user policy; and sending the compilation result to the one service processing unit by the unified policy engine.

6. The device according to claim 5, wherein the hardware processor is further configured to perform:

parsing the each user policy, and extracting the condition element and the action element that are comprised in the each user policy; and extracting the information corresponding to the condition element and the action element from the information obtained through rule conversion.

7. The device according to claim 6, wherein combining the condition element and the action element of the each user policy with information corresponding to the condition element and the action element, and compiling each result obtained through combination comprises:

optimizing the information corresponding to the condition element and the action element of the each user policy;

combining the condition element and the action element of the each user policy with the optimized information corresponding to the condition element and the action element, and compiling each result obtained through combination; and wherein the optimization comprises:
deleting repeated information; and/or
creating a mapping relationship between the condition element and a numeric identifier ID, and a mapping relationship between the action element and a numeric ID.

8. The device according to claim 5, wherein when the each user policy comprises a centralized user policy, reading information of an application knowledge base corresponding to the each user policy comprises reading information of all application knowledge bases.

9. A non-transitory computer readable medium including operations stored thereon that when processed by at least one processing unit cause a system to form a unified policy engine and a plurality of service processing units respectively corresponding to a plurality of application knowledge bases, and to perform the acts of:

obtaining a plurality of user policies by the unified policy engine, wherein each user policy includes at least one classified user policy, each classified user policy corresponds to a specific user policy classification, the each user policy is configured in advance to be sent to one service processing unit corresponding to the each user policy in the plurality of service processing units, each service processing unit further corresponds to one application knowledge base of one application service in the plurality of application knowledge bases, and the plurality of service processing units include at least two service processing units selected from: a wide area network optimization controller (WOC), a deep packet inspection (DPI), an application delivery controller (ADC), a uniform resource locator filter (URLF), or an intrusion prevention system (IPS);

reading information of the plurality of application knowledge bases corresponding to the plurality of user policies, and performing rule conversion on the information in the unified policy engine, so that the description language of the information is converted to be consistent with a same one rule description language of the plurality of user policies;

combining a condition element and an action element of the each user policy with information corresponding to the condition element and the action element, and compiling each result obtained through combination to obtain a compilation result in the unified policy engine, wherein the information corresponding to the condition element and the action element is information required by the condition element and the action element in the information obtained through rule conversion, and the compilation result is a data structure that is capable of being identified and used by the one service processing unit corresponding to the each user policy; and sending the compilation result to the one service processing unit by the unified policy engine.

* * * * *